(12) United States Patent
Kowarz et al.

(10) Patent No.: US 7,646,453 B2
(45) Date of Patent: Jan. 12, 2010

(54) REFLECTIVE POLARIZER WITH POLARIZATION SPLITTING MICROSTRUCTURE

(75) Inventors: Marek W. Kowarz, Henrietta, NY (US); Jehuda Greener, Rochester, NY (US); Charles C. Anderson, Penfield, NY (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 338 days.

(21) Appl. No.: 11/643,093

(22) Filed: Dec. 21, 2006

(65) Prior Publication Data

US 2007/0279554 A1    Dec. 6, 2007

Related U.S. Application Data

(60) Provisional application No. 60/810,885, filed on Jun. 5, 2006.

(51) Int. Cl.
*G02F 1/1335* (2006.01)
(52) U.S. Cl. .......................... 349/96; 349/103
(58) Field of Classification Search ............ 349/96–103
See application file for complete search history.

(56) References Cited

U.S. PATENT DOCUMENTS

| | | | |
|---|---|---|---|
| 2,748,659 A | 6/1956 | Geffcken et al. | |
| 5,061,050 A | 10/1991 | Ogura | |
| 5,183,597 A | 2/1993 | Lu | |
| 5,422,756 A | 6/1995 | Weber | |
| 5,559,634 A | 9/1996 | Weber | |
| 7,408,622 B2 * | 8/2008 | Fiolka et al. ................ | 355/71 |
| 2003/0025863 A1 | 2/2003 | Iijima | |
| 2004/0061812 A1 | 4/2004 | Maeda | |
| 2004/0125275 A1 | 7/2004 | Kurasawa | |
| 2005/0275122 A1 | 12/2005 | Benson et al. | |
| 2005/0275132 A1 | 12/2005 | Bourdelais et al. | |

FOREIGN PATENT DOCUMENTS

EP    1 659 442    5/2006

OTHER PUBLICATIONS

International Search Report of corresponding PCT Application No. PCT/US2007/012674, Nov. 2007.

* cited by examiner

*Primary Examiner*—Kevin S Wood
(74) *Attorney, Agent, or Firm*—Edwin Oh

(57) ABSTRACT

A reflective polarizer contains:
(a) a light-entrance medium having a light-entrance surface and a microstructured surface with a series of prismatic structures, wherein first and second sidewalls of each prismatic structure have an inclination angle of more than 53 degrees with respect to the light-entrance surface;
(b) a polarization-selective thin film optical coating on the series of prismatic structures, for transmitting a first polarization of light and reflecting a second polarization; and
(c) a light-exit medium on the polarization-selective thin film optical coating that provides a smooth light-exit surface.

12 Claims, 18 Drawing Sheets

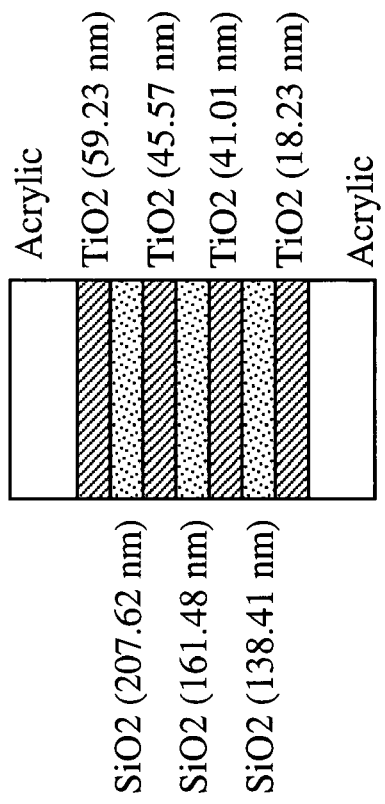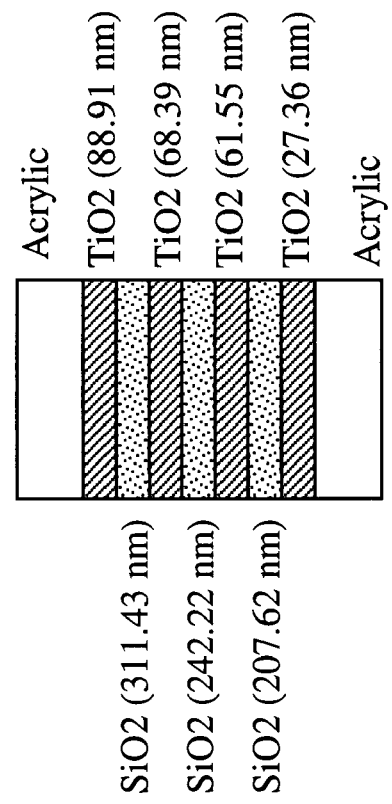
FIG. 19a
FIG. 19b

REFLECTIVE POLARIZER WITH POLARIZATION SPLITTING MICROSTRUCTURE

CROSS REFERENCE TO RELATED APPLICATION

This application claims priority of provisional application No. 60/810,885 filed on Jun. 5, 2006.

FIELD OF THE INVENTION

This invention relates to a reflective polarizer film that preferentially transmits one polarization of light and reflects the orthogonal polarization. More particularly, the invention relates to a reflective polarizer film that contains a prismatic interface microstructure with a polarization-dependent thin film optical coating. The invention is particularly useful for increasing the brightness and efficiency of LCD backlights.

BACKGROUND OF THE INVENTION

Reflective polarizers are widely used in liquid crystal displays (LCD) backlights to increase image brightness and light utilization efficiency. The reflective polarizers usually serve as pre-polarizers for recycling the polarization component that would be absorbed by the absorbing polarizers of the LCD. Current LCDs utilize primarily two types of reflective polarizers, DBEF and DRPF, both based on birefringent polymers and sold by 3M. Polarizers having optical thin films on prismatic surface interfaces with a 90 degree apex angle have been also been proposed as reflective polarizers for LCD backlights. However, to date, such prismatic reflective polarizers have not been commercialized because of poor performance and high manufacturing cost.

FIG. 1, adapted from FIG. 3. of U.S. Pat. No. 5,422,756, illustrates a prismatic reflective polarizer 10 consisting of a light-entrance medium 12 having a microstructured surface 14 with a series of prismatic structures 16. A thin film optical coating 18, with alternating thin film layers of high refractive index material and low refractive index material, is situated on the microstructured surface 14. The optical coating 18 is designed to preferentially transmit one polarization of light and reflect the orthogonal polarization. An inverted structured surface 20 is optically coupled to the optical coating 18 and provides a smooth light-exit surface 22. Geffcken et al. first proposed this type of prismatic reflective polarizer 50 years ago in U.S. Pat. No. 2,748,659, issued on Jun. 5, 1956, "LIGHT SOURCE, SEARCHLIGHT OR THE LIKE FOR POLARIZED LIGHT." Improvements to this approach, directed primarily towards applications in LCD backlights, have been disclosed by Ogura in U.S. Pat. No. 5,061,050, issued on Oct. 29, 1991, "POLARIZER," by Weber in U.S. Pat. No. 5,422,756, issued on Jun. 6, 1995, "BACKLIGHTING SYSTEM USING A RETROREFLECTING POLARIZER," and by Weber in U.S. Pat. No. 5,559,634, issued on Sep. 24, 1996, "RETROREFLECTING POLARIZER.

As shown in FIG. 1, light rays incident on the first sidewall 17a of the prismatic structures 16 are either transmitted by the optical coating 18, for p-polarized light 30, or reflected, for s-polarized light 32. P-polarized light 30 then exits the prismatic reflective polarizer 10 unperturbed. However, the once-reflected s-polarized rays 34 are reflected a second time by the second sidewall 17b of the prismatic structure 16. S-polarized light 32 is therefore retro-reflected back towards its origin as doubly-reflected s-polarized rays 36. For the prismatic reflective polarizer 10 to function, the apex angle 24 of the prismatic structure 16 should be between 80 and 100 degrees, preferably 90 degrees. Therefore, relative to light-entrance surface 21 of the light-entrance medium 12, the inclination angles 26 should be approximately 45 degrees.

The optical coating 18 contains a stack of alternating high-index and low-index layers that are quarter-wave thick, relative to the wavelength of light in the material. As disclosed by Weber in the '634 patent, for application to visible light in LCD backlights where light recycling is desired over the entire visible spectrum, the optical coating 18 has a number of sub-stacks. Each of the sub-stacks is designed with quarter-wave layers for a different portion of the visible spectrum. The design disclosed in the '634 patent has a total of 28 layers to cover the entire visible spectrum. Such a high layer count would be very challenging to manufacture at low cost for a large area. Furthermore, as described in '634, the angular performance of the coating limits the useful function of the prismatic reflective polarizer 10 to an angular range of approximately +/−10 degrees in air. The limited angular performance is due, in large part, to the fact that light is incident on the thin film optical coating 18 at angle of approximately 45 degrees with respect to the surface normal. As is well known in the art, polarizing optical film stacks are more difficult to design, and have a narrower performance range, for 45 degree incidence than at somewhat larger angles.

The prismatic reflective polarizers that have been previously disclosed have two significant challenges: 1) a severe angular and wavelength sensitivity, limiting the number of suitable applications, and 2) a large number alternating high and low refractive layers, leading to high manufacturing cost. Increasing the layer count can diminish wavelength sensitivity, but this remedy increases manufacturing cost even further. There is a need therefore for a prismatic reflective polarizer that works over a large range of incident angles and wavelengths and that can be manufactured at reasonable cost.

SUMMARY OF THE INVENTION

The present invention provides a reflective polarizer comprising:

(a) a light-entrance medium having a light-entrance surface and a microstructured surface with a series of prismatic structures, wherein first and second sidewalls of each prismatic structure have an inclination angle of more than 53 degrees with respect to the light-entrance surface;

(b) a polarization-selective thin film optical coating on the series of prismatic structures, for transmitting a first polarization of light and reflecting a second polarization; and (c) a light-exit medium on the polarization-selective thin film optical coating that provides a smooth light-exit surface.

The invention also comprises a method of fabricating the polarizer and an LCD display containing the polarizer. The polarizer of the invention with the indicated inclination angle has a larger tolerance for incident angle and wavelength than other known prismatic reflective polarizers, and can be manufactured at lower cost.

BRIEF DESCRIPTION OF THE DRAWINGS

FIG. 19a shows a seven layer coating design for the polarizer of the invention that is tolerant to uniform layer thickness variation.

FIG. 19b shows a seven layer coating where the thickness of each layer is 150% that of FIG. 19a.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
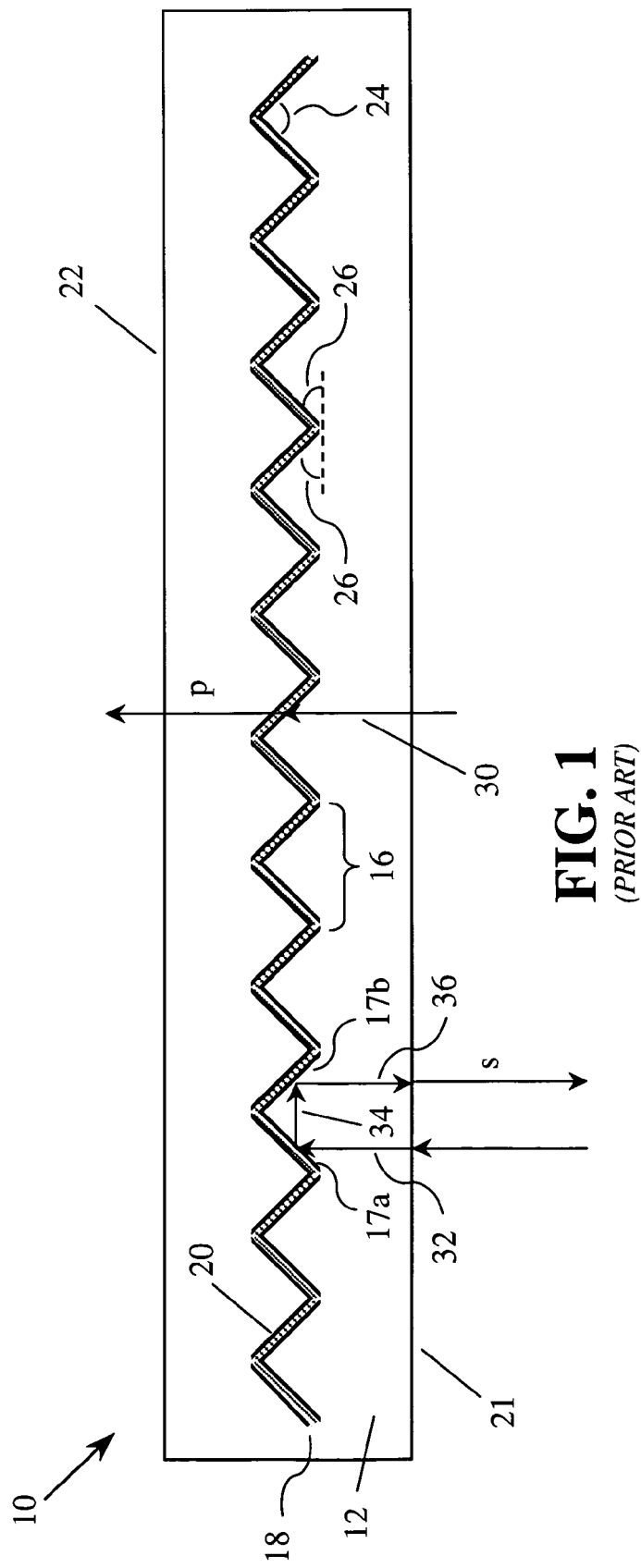
FIG. 1 is intended to represent a schematic cross-section of the prior art in U.S. Pat. No. 5,422,756.
Figure 2:
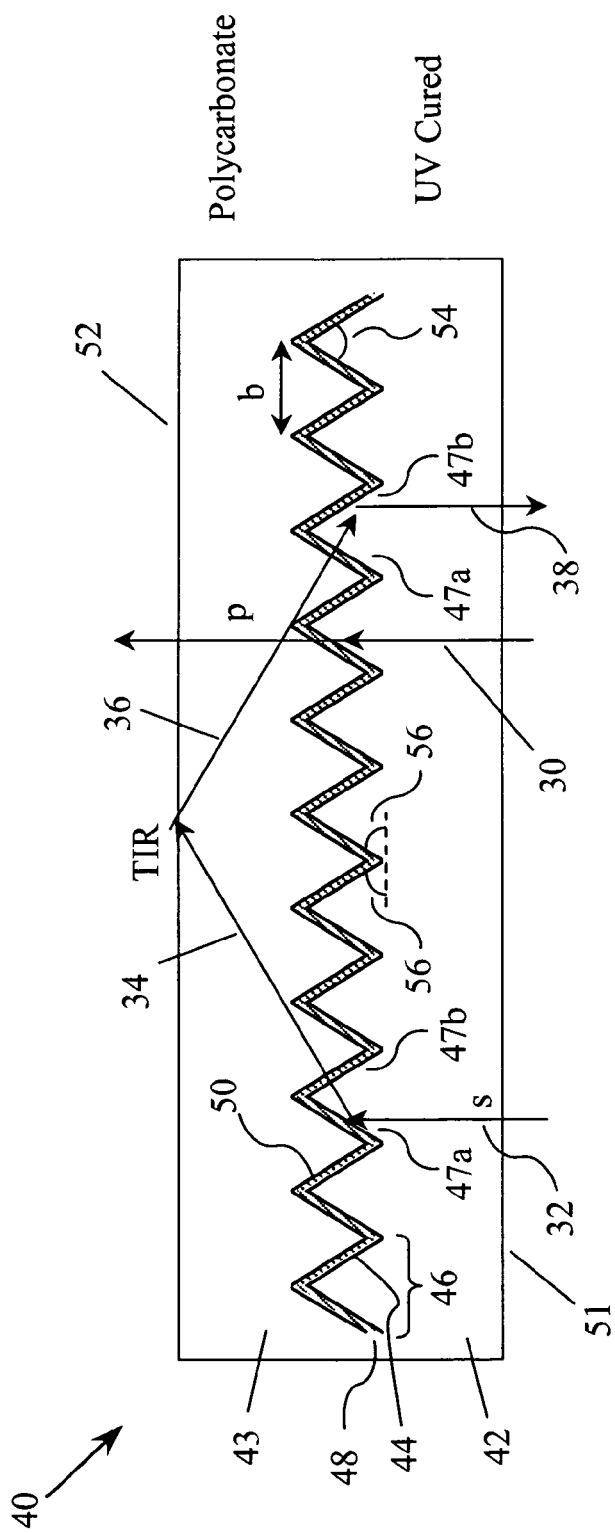
FIG. 2 is a schematic cross-section of the polarizer of the present invention.

FIG. 2 illustrates the prismatic reflective polarizer 40 of the present invention, which can be designed to provide good performance simultaneously over the entire visible spectrum and over a wide range of incidence angles. In addition, the invention can be fabricated at relatively low cost. The prismatic reflective polarizer 40 has a light-entrance medium 42 with a light-entrance surface 51 and an opposing microstructured surface 44 that contains a series of prismatic structures 46. A thin film optical coating 48, with alternating thin film layers of high and low refractive index materials, is situated on the microstructured surface 44. In a preferred embodiment, the optical coating 48 is designed to preferentially transmit p-polarized light 30 and reflect s-polarized light 32. An inverted structured surface 50 is optically coupled to the optical coating 48 and provides a smooth light-exit surface 52. As is well known in the art, for p-polarized light, the electric field is parallel to the plane of incidence that contains the incident light ray and the surface normal, whereas for s-polarized light, the electric field is perpendicular to the plane of incidence.

Light rays incident on the first sidewall 47a of the prismatic structures 46 are either transmitted by the optical coating 48, for p-polarized light 30, or reflected, for s-polarized light 32. P-polarized light 30 then exits the prismatic reflective polarizer 40 unperturbed through the light-exit medium 53. As illustrated in FIG. 2, the once-reflected s-polarized rays 34 are primarily transmitted through the optical coating 48 on the second sidewall 47b of the prismatic structure 46. These rays then undergo total internal reflection (TIR) at the smooth light-exit surface 52 of the light-exit medium 53. The doubly-reflected s-polarized rays 36 travel back towards the microstructured surface 44, pass through the first sidewall 47a, and reflect at the second sidewall 47b. S-polarized light 32 is therefore primarily retro-reflected back towards its origin as triply-reflected s-polarized rays 38. For the prismatic reflective polarizer 40 to function as designed, the inclination angles 56 of the sidewalls should be more than 53 degrees. Preferred inclination angles 56 are between 55 and 70 degrees, as described subsequently. For a symmetric microstructured surface 44 of the type depicted in FIG. 2, this range of inclination angles corresponds to apex angles between 40 and 70 degrees. More preferably, the inclination angles 56 should be between 60 and 70 degrees and the corresponding apex angles between 40 and 60 degrees.

The prismatic structures 46 may have a triangular cross-section with relatively flat first and second sidewalls, 47a and 47b, or the sidewalls may slightly rounded. Furthermore, the prismatic structures may be continuous or non-continuous along the entire prismatic reflective polarizer 40. For non-symmetric microstructured surfaces 44, where the first and second sidewalls, 47a and 47b, have different angles with respect to the surface of the prismatic reflective polarizer 40, the value of the inclination angle will be taken as the average for the two sidewalls.

FIG. 2 only shows a few of the ray paths in the prismatic reflective polarizer 40 to illustrate the basic function. It will be apparent to those skilled in the art that a multitude of ray paths are present in practice. For example, depending on the design of the optical coating 48, a fraction of the once-reflected s-polarized rays 34 may be reflected by the second sidewall 47b and reflected once more from the first sidewall 47a, exiting the prismatic reflective polarizer 40 at the light-entrance surface 51.

Figure 3A:
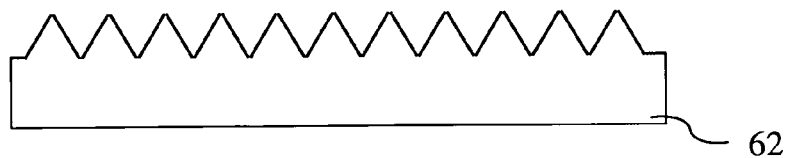
FIGS. 3a-3d show the fabrication sequence for the polarizer.
Figure 3B:
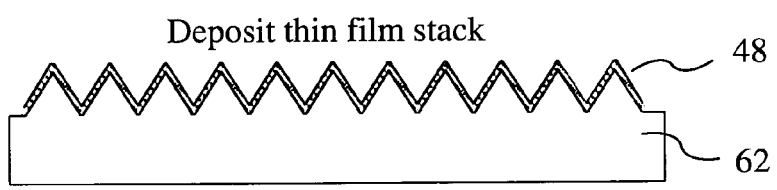
Figure 3C:
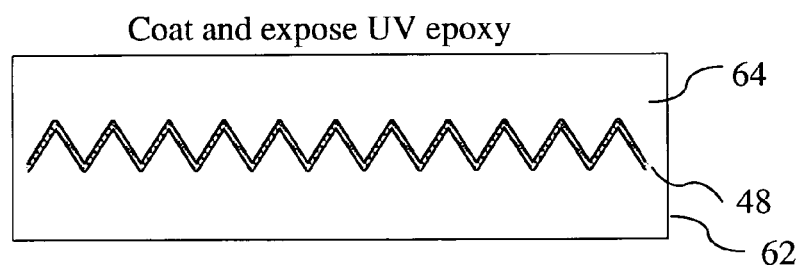
Figure 3D:
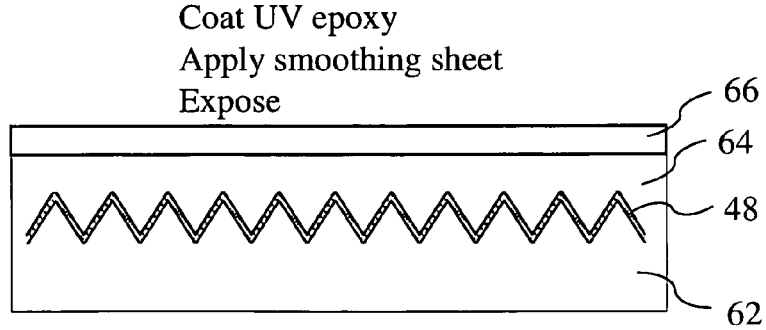

FIGS. 3a through 3c depict one possible fabrication sequence for manufacturing the prismatic reflective polarizer 40. The thin film optical coating is vacuum deposited on a patterned surface of a micro-patterned prism film substrate 62, by e-beam evaporation, thermal evaporation, sputtering, chemical vapor deposition (CVD) or other deposition methods well known to the skilled artisan. The prism film substrate 62 is preferably made of an appropriate transparent plastic, such as polycarbonate or PMMA. Alternatively, it could be made from glass or other sufficiently transparent materials, such as silicon for infrared wavelengths. The high and low refractive index layers that comprise the thin film optical coating 48 can be chosen from many suitable materials. These materials include $TiO_2$ and ZnS for the high refractive index layer and $SiO_2$, $MgF_2$, LiF and $BaF_2$ for the low refractive index layer. The prism film substrate 62 can be produced from a monolithic polymeric cast sheet by a variety of thermal embossing and extrusion roll molding micro-patterning methods such as the one described by Benson et al. in US Patent Application 2005/0275122, "SMOOTH COMPLIANT BELT FOR USE WITH MOLDING ROLLER" and by Bourdelais et al. in US Patent Application 2005/0275132, "BELT OVER COMPLIANT ROLLER USED WITH MOLDING ROLLER". Alternatively, the prismatic pattern on the film substrate can be produced via methods involving UV-curing techniques well known to those skilled in the art, for example, as described by Lu in U.S. Pat. No. 5,183,597, issued on Feb. 2, 1993, "METHOD OF MOLDING MICRO-STRUCTURE BEARING COMPOSITE PLASTIC ARTICLES". A thick layer of UV curable acrylic resin 64 is then coated on the vacuum-deposited layers and exposed to UV light. Other types of UV-curable or thermally curable resins can also be used to coat the vacuum-deposited layers. For example, epoxies, polyurethanes or polysilanes can be used as top-coats in this embodiment. Topcoats can also be produced by solvent casting methods involving casting a concentrated solution (dope) of a suitable polymer on the prismatic surface and then removing the solvent by drying. Materials that can be applied in this manner include, but are not limited to, a variety of celluloses, polycarbonates and acrylic thermoplastic polymers. To ensure that the microstructure surface features do not appear on the final light-entrance and light-exit surfaces, a smoothing sheet 66 can be placed on top of the epoxy, as shown in FIG. 3d. It should be noted that depending on the design, the prism film 62 may be either the light-entrance medium 42 or the light-exit medium 43.

For the purpose of the present invention the polymeric planarizing layer that forms either the light-entrance medium 42 or the light-exit medium 43 may be applied by various methods including lamination, melt extrusion, or liquid coating. To enable optimal filling of the topographical features, liquid coating, especially using relatively low viscosity coating formulations is preferred. The coating formulation may be aqueous or organic solvent based. A wide variety of liquid coating methods may be effectively employed depending on the composition of the formulation and the desired coating speeds. Suitable methods include extrusion hopper coating, slide bead coating, gravure coating, curtain coating, spray coating, knife coating, and others.

In order to achieve the relatively low viscosities at the high solids necessary to obtain the desired thick planarizing layers it is desirable to utilize coating formulations comprising dispersed polymeric binders or low molecular weight monomeric or oligomeric materials.

The polymeric planarizing layer of the invention may comprise radiation or thermally cured compositions. Ultraviolet (UV) radiation and electron beam radiation are the most commonly employed radiation curing methods. UV curable compositions are particularly useful for creating the planarizing layer of this invention and may be cured using two major types of curing chemistries, free radical chemistry and cationic chemistry. Acrylate monomers (reactive diluents) and oligomers (reactive resins and lacquers) are the primary components of the free radical based formulations, giving the cured coating most of its physical characteristics. Photo-initiators are required to absorb the UV light energy, decompose to form free radicals, and attack the acrylate group C=C double bond to initiate polymerization. Cationic chemistry utilizes cycloaliphatic epoxy resins and vinyl ether monomers as the primary components. Photo-initiators absorb the UV light to form a Lewis acid, which attacks the epoxy ring initiating polymerization. By UV curing is meant ultraviolet curing and involves the use of UV radiation of wavelengths between 280 and 420 nm preferably between 320 and 410 nm.

Examples of UV radiation curable resins and lacquers usable for the planarizing layer useful in this invention are those derived from photo polymerizable monomers and oligomers such as acrylate and methacrylate oligomers (the term "(meth)acrylate" used herein refers to acrylate and methacrylate), of polyfunctional compounds, such as polyhydric alcohols and their derivatives having (meth)acrylate functional groups such as ethoxylated trimethylolpropane tri(meth) acrylate, tripropylene glycol di(meth)acrylate, trimethylolpropane tri(meth)acrylate, diethylene glycol di(meth)acrylate, pentaerythritol tetra(meth)acrylate, pentaerythritol tri (meth)acrylate, dipentaerythritol hexa(meth)acrylate, 1,6-hexanediol di(meth)acrylate, or neopentyl glycol di(meth) acrylate and mixtures thereof, and acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin, and the like and mixtures thereof, and ionizing radiation-curable resins containing a relatively large amount of a reactive diluent. Reactive diluents usable herein include monofunctional monomers, such as ethyl (meth)acrylate, ethylhexyl (meth)acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth) acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth) acrylate.

Among others, in the present invention, conveniently used radiation curable lacquers, for use in planarizing layers, include urethane (meth)acrylate oligomers. These are derived from reacting diisocyanates with an oligo(poly)ester or oligo (poly)ether polyol to yield an isocyanate terminated urethane. Subsequently, hydroxy terminated acrylates are reacted with the terminal isocyanate groups. This acrylation provides the unsaturation to the ends of the oligomer. The aliphatic or aromatic nature of the urethane acrylate is determined by the choice of diisocyanates. An aromatic diisocyanate, such as toluene diisocyanate, will yield an aromatic urethane acrylate oligomer. An aliphatic urethane acrylate will result from the selection of an aliphatic diisocyanate, such as isophorone diisocyanate or hexyl methyl diisocyanate. Beyond the choice of isocyanate, polyol backbone plays a pivotal role in determining the performance of the final the oligomer. Polyols are generally classified as esters, ethers, or a combination of these two. The oligomer backbone is terminated by two or more acrylate or methacrylate units, which serve as reactive sites for free radical initiated polymerization. Choices among isocyanates, polyols, and acrylate or methacrylate termination units allow considerable latitude in the development of urethane acrylate oligomers. Urethane acrylates, like most oligomers, are typically high in molecular weight and viscosity. These oligomers are multifunctional and contain multiple reactive sites. Because of the increased number of reactive sites, the cure rate is improved and the final product is crosslinked. The oligomer functionality can vary from 2 to 6.

Among others, conveniently used radiation curable resins, for use in planarizing layers, also include polyfunctional acrylic compounds derived from polyhydric alcohols and their derivatives such as mixtures of acrylate derivatives of pentaerythritol such as pentaerythritol tetraacrylate and pentaerythritol triacrylate functionalized aliphatic urethanes derived from isophorone diisocyanate. Some examples of urethane acrylate oligomers used in the practice of this invention that are commercially available include oligomers from Sartomer Company (Exton, Pa.). An example of a resin that is conveniently used in the practice of this invention is CN 968 ® from Sartomer Company.

In addition to radiation cured coatings, formulations comprising aqueous or solvent dispersed polymeric binders including acrylics, urethanes, urethane-acrylic hybrids, styrene polymers, olefins, and others. Aqueous dispersions of acrylic, urethane, or urethane-acrylic polymer dispersions are particularly preferred. The coatings may be thermally cured by the addition of suitable crosslinking agents or they may be uncured. In order to provide low film curl for these thick planarizing layers it is desirable to utilize formulations that do not create high stresses after the coating, drying and curing of the layer. Therefore, it is desirable to utilize formulations that undergo limited shrinkage during drying and curing and have moderate stiffness (modulus).

Certain embodiments of the prismatic reflective polarizer 40 have a relatively low refractive index for the light-entrance medium 42 or the light-exit medium 43, for improved angular and wavelength operation. Suitable low-index materials comprise fluorine-containing homopolymers or copolymers having a refractive index of less than 1.48, preferably with a refractive index between about 1.35 and 1.40. Suitable fluorine-containing homopolymers and copolymers include: fluoro-olefins (for example, fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid, and completely or partially fluorinated vinyl ethers.

The light rays incident on the thin film optical coating 48 are centered about an incidence angle, relative to the surface normal, that is equal to the inclination angle 56. Because the inclination angle 56 is large, 53 degrees or more, the optical coating 48 can be designed to separate P-polarized light 30 from S-polarized light 32 with fewer layers than one designed for 45 degrees. The coating can also be designed to perform over a wide range of incidence angles and wavelengths.

Figure 4:
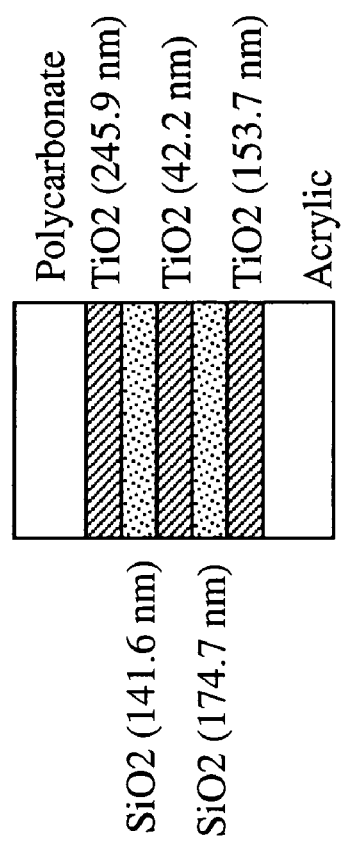
FIG. 4 shows a sample multilayer coating design for the polarizer of the invention.
Figure 5A:
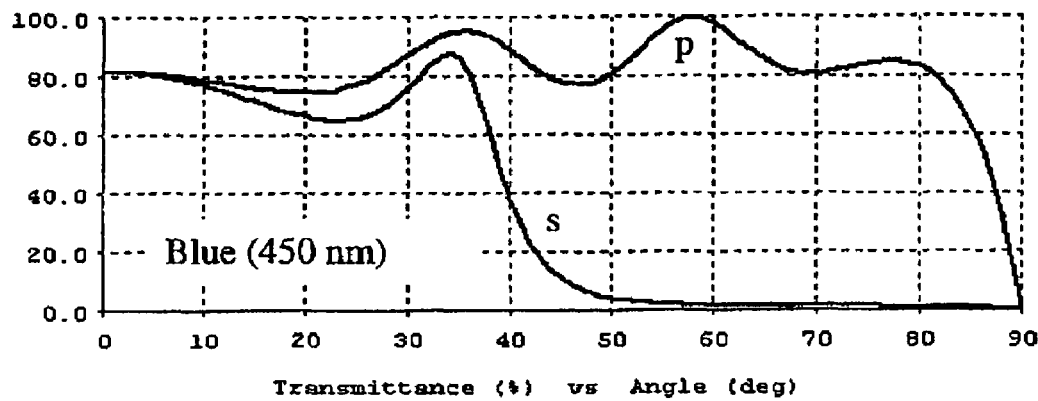
FIGS. 5a through 5c show the transmittance curves for the invention for three different wavelengths of light, for the polarizer of FIG. 4.
Figure 5B:
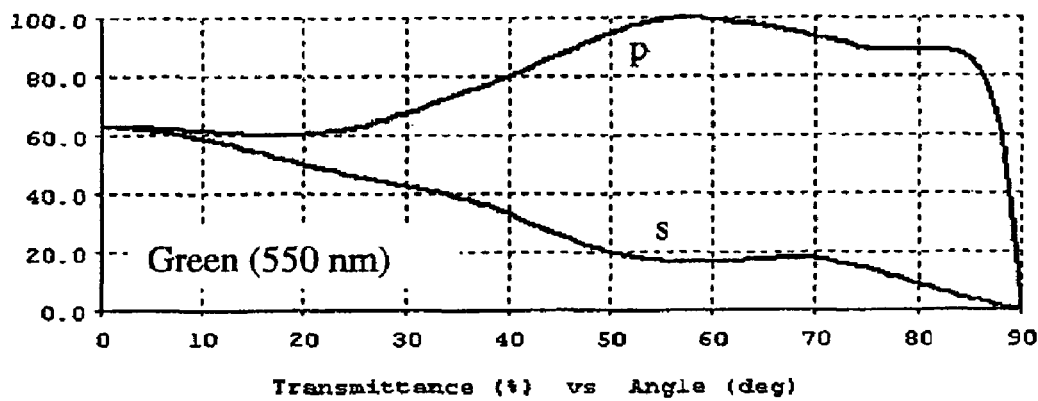
Figure 5C:
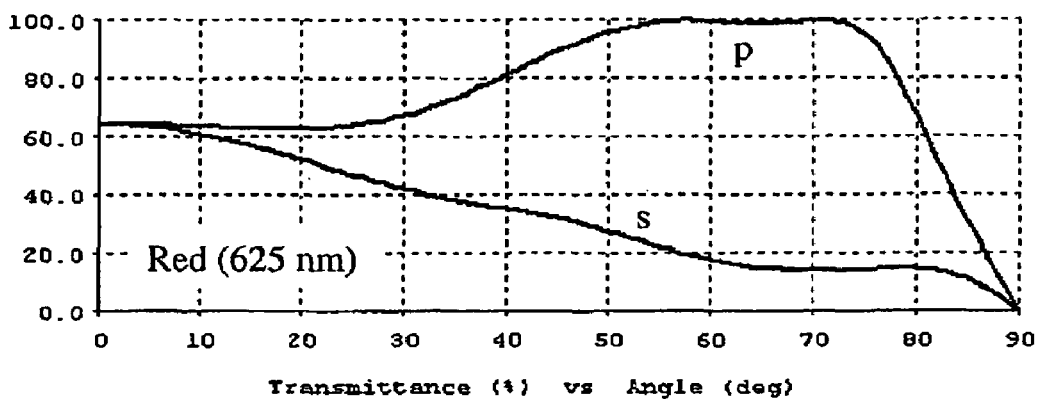
Figure 6:
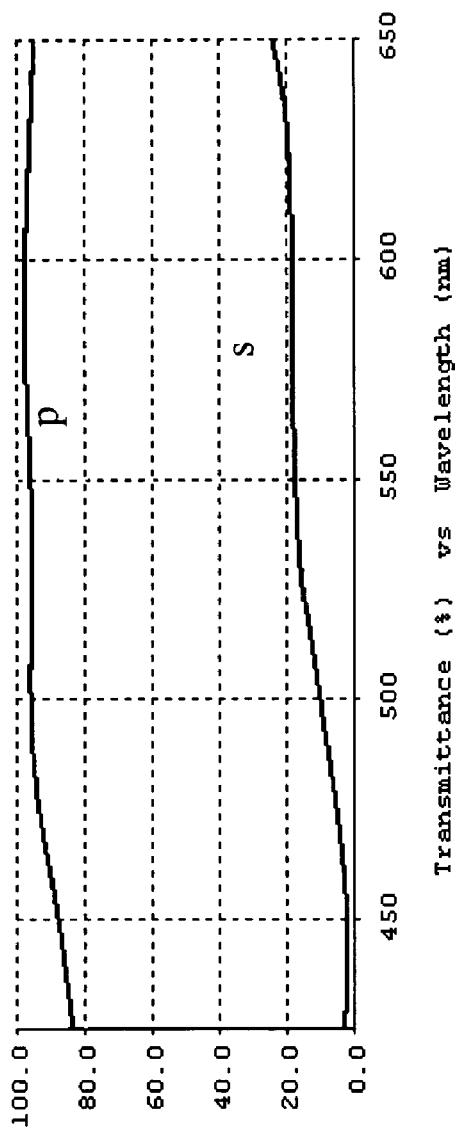
FIG. 6 shows the transmittance for a 65° inclination angle averaged over a 40° range of incidence angles, for the polarizer of FIG. 4.

FIG. 4 shows a five-layer coating design consisting of alternating layers of $TiO_2$ and $SiO_2$, with a light-entrance medium that is a UV curable acrylic (n=1.49) and a light-exit medium that is polycarbonate (n=1.59). To provide broad angular and wavelength tolerance, the layer thickness selection is not restricted to multiples of a quarter-wave. FIGS. 5a through 5c show the modeled transmittance curves of the s and p polarizations, at wavelengths of 450 nm (blue), 550 nm (green) and 625 nm (red), versus incidence angle relative to the surface normal in the light-entrance medium. Since both $TiO_2$ and $SiO_2$ can be made with very little absorption, the reflectance values for this design are simply 100 minus transmittance. This coating design performs well when used on a microstructured surface 44 that has inclination angles 56 between 60 and 70 degrees. FIG. 6 shows the transmittance curves for a 65-degree inclination angle 56 that has been (uniformly) averaged over a 40-degree range of incidence angles, from 45-degree incidence to 85-degree incidence, within the light-entrance medium. This corresponds to an angular range of approximately 60 degrees in air. The curves in FIG. 6 show that this five-layer coating can transmit over 90 percent of the p polarization and reflect over 80 percent of the s polarization over most of the visible spectrum for a broad range of incidence angles.

Figure 7:
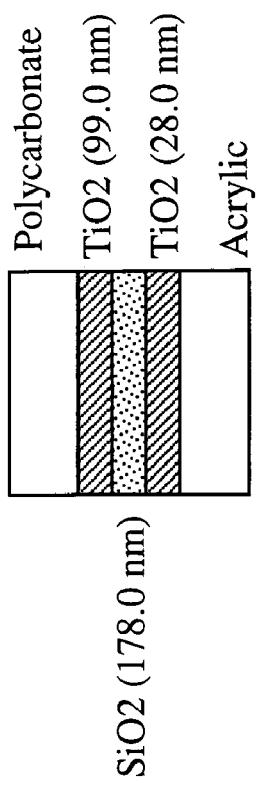
FIG. 7 shows a simple three-layer design of the polarizer of the invention.
Figure 8:
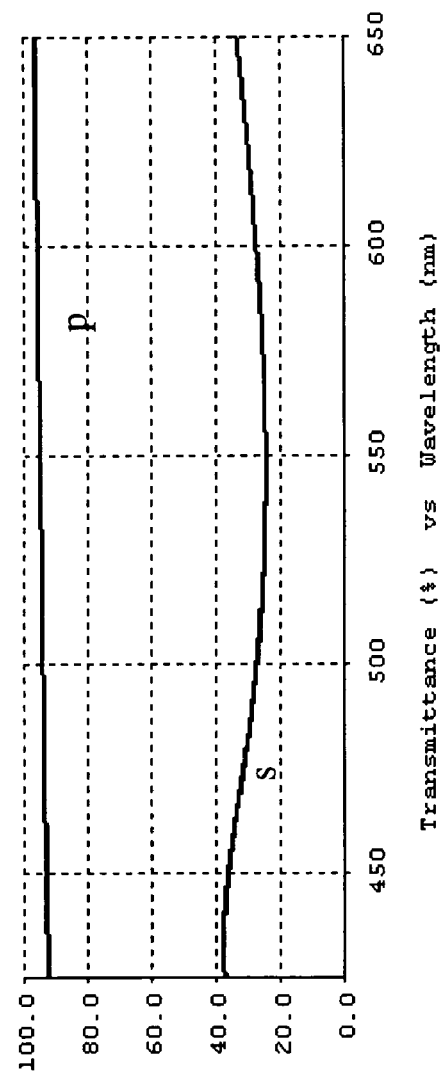
FIG. 8 shows the transmittance curve over a 40° range of incidence angles, for the polarizer of FIG. 7.

To maximize throughput during the coating process, it is desirable to keep the layer count and thickness to a minimum. FIG. 7 shows a simple three-layer design, again with $TiO_2$ and $SiO_2$ layers, that has two very thin $TiO_2$ layers. Since the coating rate of $TiO_2$ is usually much lower than $SiO_2$, keeping the $TiO_2$ layers thin helps maximize manufacturing throughput. FIG. 8 shows the 40-degree angle-averaged transmittance curves when this coating is applied to a microstructured surface 44 that has a 65-degree inclination angle 56. The transmittance curves have again been averaged from 45-degree incidence to 85-degree incidence.

Figure 9:
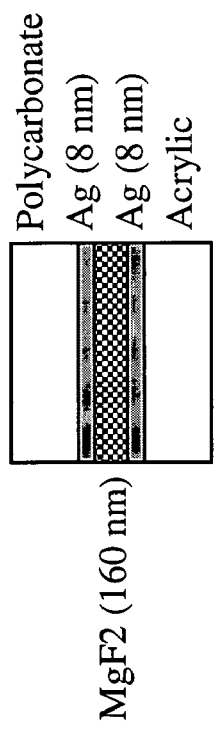
FIG. 9 shows a multilayer design using a metallic layer.
Figure 10:
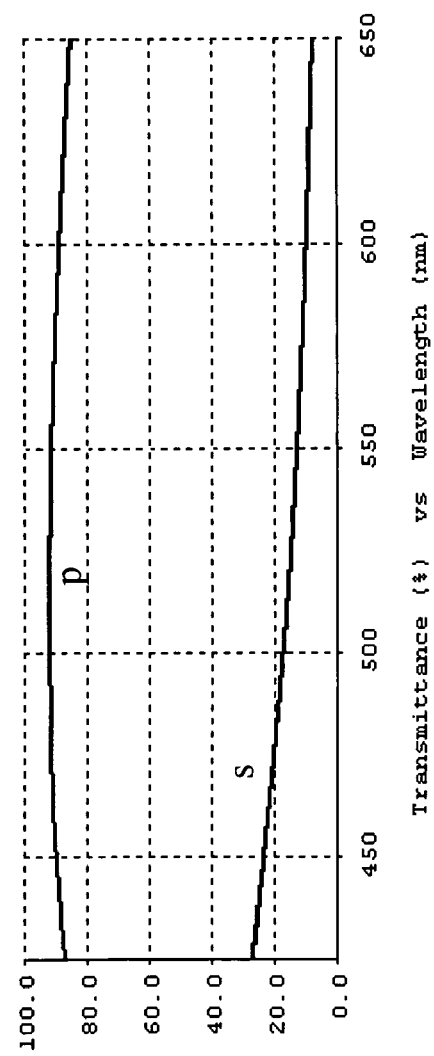
FIG. 10 shows the transmittance curve averaged over a 40° range of incidence angles for the polarizer of FIG. 9.

Another coating option is to use a very thin metallic coating, preferably silver, for one or more of the layers. FIG. 9 shows a silver microcavity design, with $MgF_2$ sandwiched between two very thin 8 nm layers of silver. The corresponding 40-degree angle-averaged transmittance curves are depicted in FIG. 10, again for a 65-degree inclination angle 56. The use of very thin silver, instead of high refractive index dielectrics such as $TiO_2$ and ZnS, enables much higher manufacturing throughput because of lower required thickness coupled with higher deposition rates. However, unlike designs that only contain dielectric layers, the metallic layers have some absorption loss present that degrades the overall light recycling capability when used in a LCD backlight.

Figure 11:
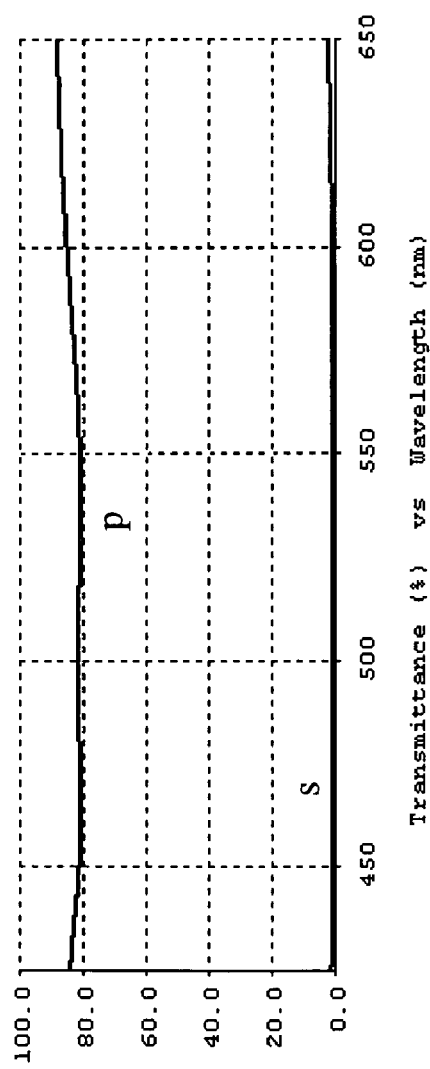
FIG. 11 shows the transmittance curve averaged over a 40° range of incidence angles for the multilayer polarizer of Table 1.

By increasing the layer count, it is possible to substantially reduce the transmittance of s-polarized light and still maintain good performance over a wide range of angles and wavelengths. The thin film design given in the table below provides very low transmittance (and high reflectance) of s-polarized light. The corresponding 40-degree angle-averaged transmittance curves for a 65-degree inclination angle 56 are depicted in FIG. 11. As is well known to those skilled in the art, the design of the thin film stack could also include more than 2 different materials.

TABLE 1

| Polycarbonate (light-exit medium) | |
|---|---|
| ZnS | 34.73 nm |
| $SiO_2$ | 56.72 |
| ZnS | 39.23 |
| $SiO_2$ | 64.06 |
| ZnS | 44.32 |
| $SiO_2$ | 72.37 |
| ZnS | 50.06 |
| $SiO_2$ | 81.75 |
| ZnS | 56.54 |
| $SiO_2$ | 92.33 |
| ZnS | 63.86 |
| $SiO_2$ | 104.29 |
| ZnS | 72.14 |
| $SiO_2$ | 117.81 |
| ZnS | 81.49 |
| $SiO_2$ | 133.07 |
| ZnS | 92.04 |
| $SiO_2$ | 150.32 |
| ZnS | 97.83 | n = 1.4 (light-entrance medium)

It is well known that vacuum deposition on structures with sloped sidewalls can produce thin film thickness variations on the structure due to shadowing, with the thickness variation depending on the structure geometry, the vacuum coater geometry and the coating process itself. For the prismatic reflective polarizer of the present invention, this structural shadowing during deposition of the thin film optical coating can cause the layer thickness near peaks of the structure to be greater than that near valleys, with a monotonic thickness increase between valleys and peaks. Since the shadowing would typically be the same for all of the layers within the thin film optical coating, the thickness variation is uniform, i.e., it is the same as a percentage for each layer. As is well known to those skilled in the art, the thickness variation can be reduced by choosing a normal incidence coater geometry and/or a conformal coating process, such as sputtering. Alternatively, the thin film coating design can be made tolerant to thickness variations. An example of such a thickness-tolerant design is illustrated in FIGS. 19a, 19b, 20a and 20b.

Figure 20A:
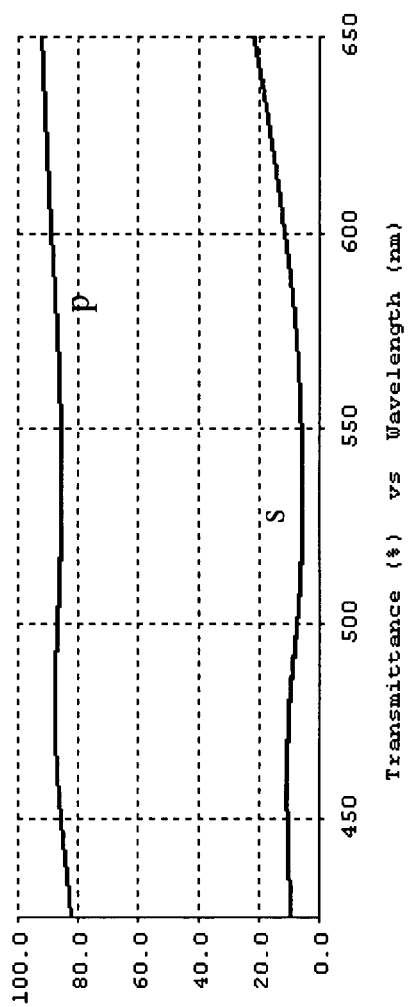
FIGS. 20a and 20b shows the transmittance curve averaged over a 40° range of incidence angles corresponding to FIGS. 19a and 19b, respectively.
Figure 20B:
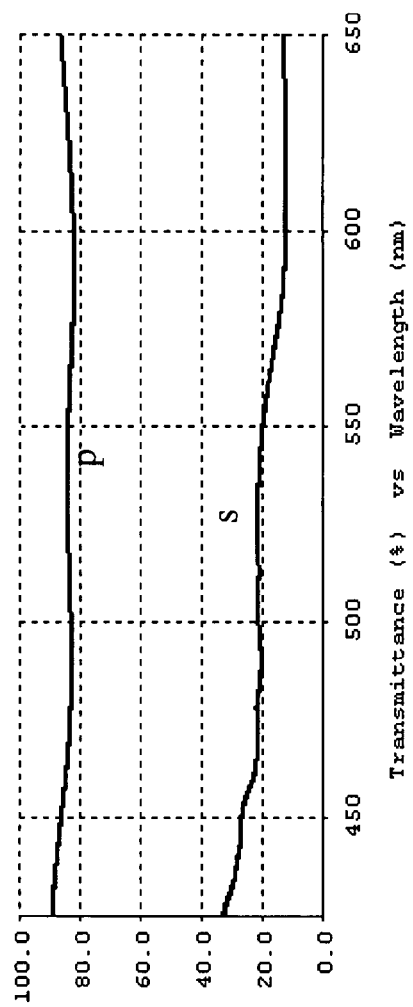

FIG. 19a shows a seven-layer coating design consisting of alternating layers of $TiO_2$ and $SiO_2$, with a light-entrance medium that is a UV curable acrylic (n=1.49) and a light-exit medium that is also acrylic (PMMA, n=1.49). FIG. 20a shows the 40-degree angle-averaged transmittance curves when this coating is applied to a microstructured surface 44 that has a 55-degree inclination angle 56, where the transmittance curves have been averaged from 35-degree incidence to 75-degree incidence. As an example of severe thickness variation during thin film deposition, FIG. 19b shows a seven-layer coating where the thickness of each layer is 150% that of FIG. 19b, with the corresponding angle-averaged transmittance curves shown in FIG. 20b. Comparing the curves in FIG. 20b to those in FIG. 20a, it is apparent that the design of FIG. 19a is very tolerant to any uniform thickness variation that might occur along the sidewalls of the prismatic reflective polarizer. It has been observed that optical thin film designs that have layers with monotonically increasing thickness from one side of the thin film stack to the other, as in FIGS. 19a and 19b, tend to be more tolerant to uniform thickness variations than other designs.

Figure 12:
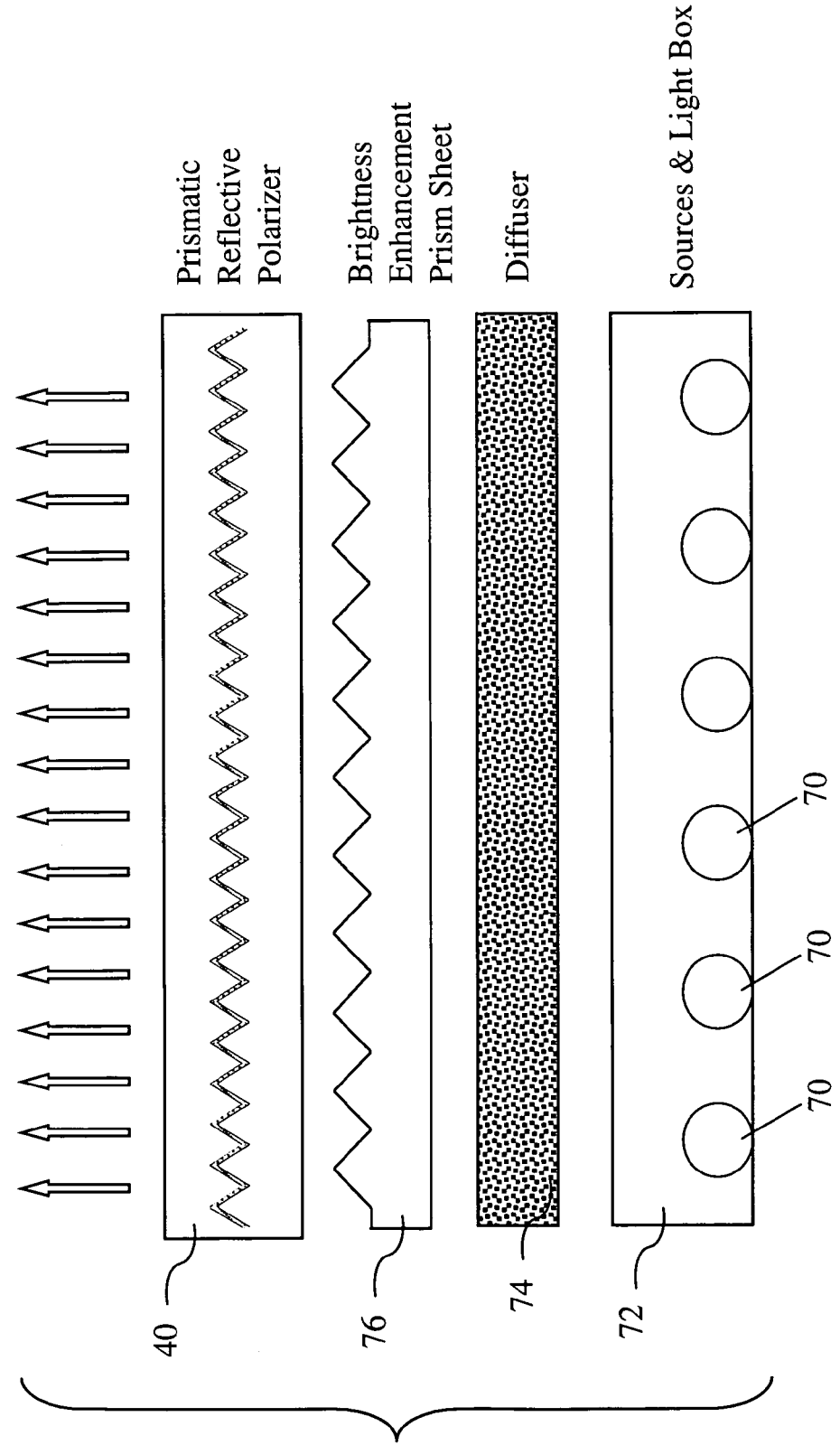
FIG. 12 shows a backlight assembly using the polarizer of the invention.

FIG. 12 shows a polarized backlight assembly for a LCD display that incorporates the prismatic reflective polarizer 40 and several light management films. A number of light sources 70, such as cold-cathode fluorescent lamps or light-emitting diodes, are situated in a light box 72 configuration, or at the ends of a light guide plate. A volume and/or surface diffuser 74 is used to uniformalize the illumination, reduce hot-spots associated with the light sources themselves and provide depolarization of the reflected s-polarized for light recycling. To increase on-axis brightness, the backlight assembly may incorporate a brightness enhancement prism sheet 76, such as BEF by 3M, or a brightness enhancement microlens array. With this configuration, light emerging from the prismatic reflective polarizer 40 is primarily of a single (linear) polarization.

When the prismatic reflective polarizer is used in certain backlight configurations and is designed to have a light-entrance medium with a lower refractive index than the light-exit medium, the brightness can be higher slightly off axis from the normal of the display than directly on axis. This effect can be mitigated with a reflective polarizer design where the light-entrance medium has a refractive index that is greater than or equal to the light-exit medium.

Figure 13:
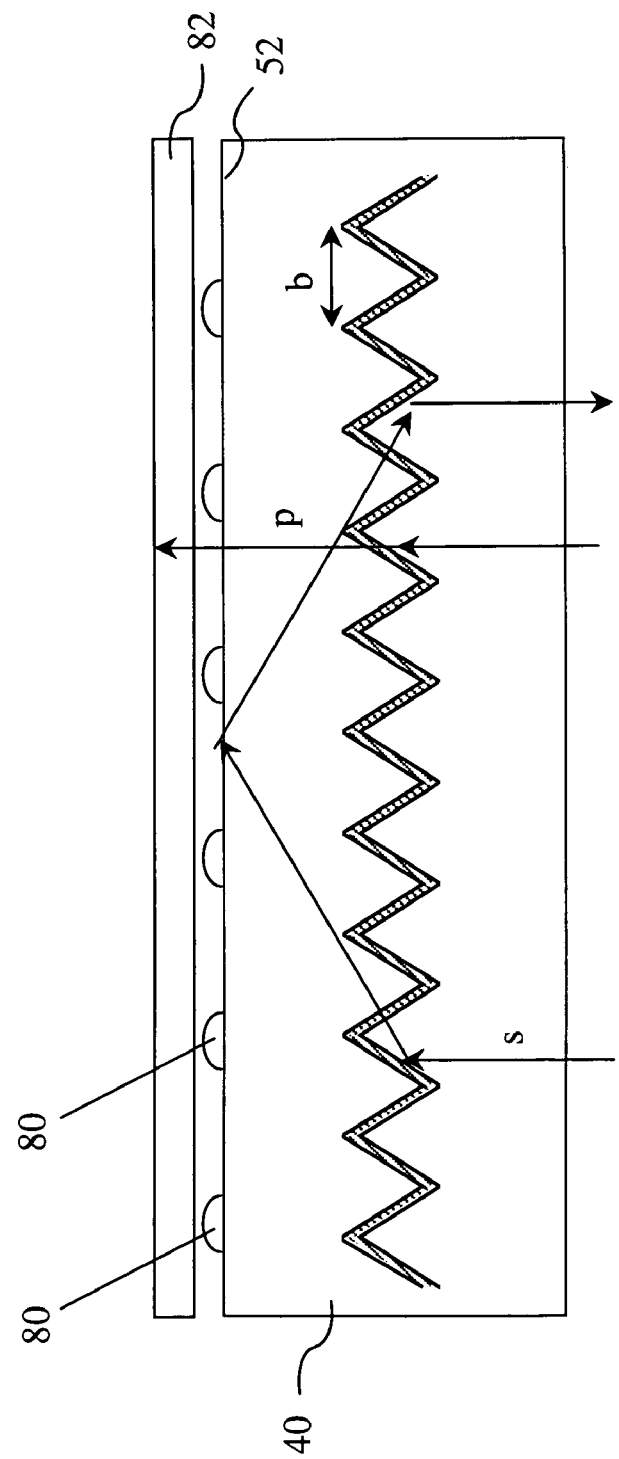
FIG. 13 shows a polarizer using standoffs to help prevent wet-out with an adjacent light management film.

As is well-known in the art, two or more light management films may come into (optical) contact and "wet-out" within an LCD display. Since total internal reflection (TIR) occurs at the smooth light-exit surface 52, it is preferable to avoid any wet-out areas when using the prismatic reflective polarizer 40. FIG. 13 shows a series of sparse standoffs 80 for wet-out prevention that are added to the light-exit surface 52. These features should occupy less than 10% of the area of the light-exit surface to avoid significant changes in the optical performance. Another option is to use spacer beads on the smooth light-exit surface 52. It should be understood that the smooth light-exit surface 52 should be smooth enough to provide total internal reflection of light over the majority of the surface area. In the embodiment of FIG. 13 with standoffs, there would be some areas of the smooth light-exit surface that are not perfectly flat that has protrusions. FIG. 13 also shows an optional retarder film 82 that rotates the p-polarized light emerging from the prismatic reflective polarizer 40 so that the polarization of the illumination aligns with the input polarization axis of the LCD panel. Since the input polarization axis varies with different types of LCD panels, the optimal choice for the retarder film depends on panel type.

Figure 14:
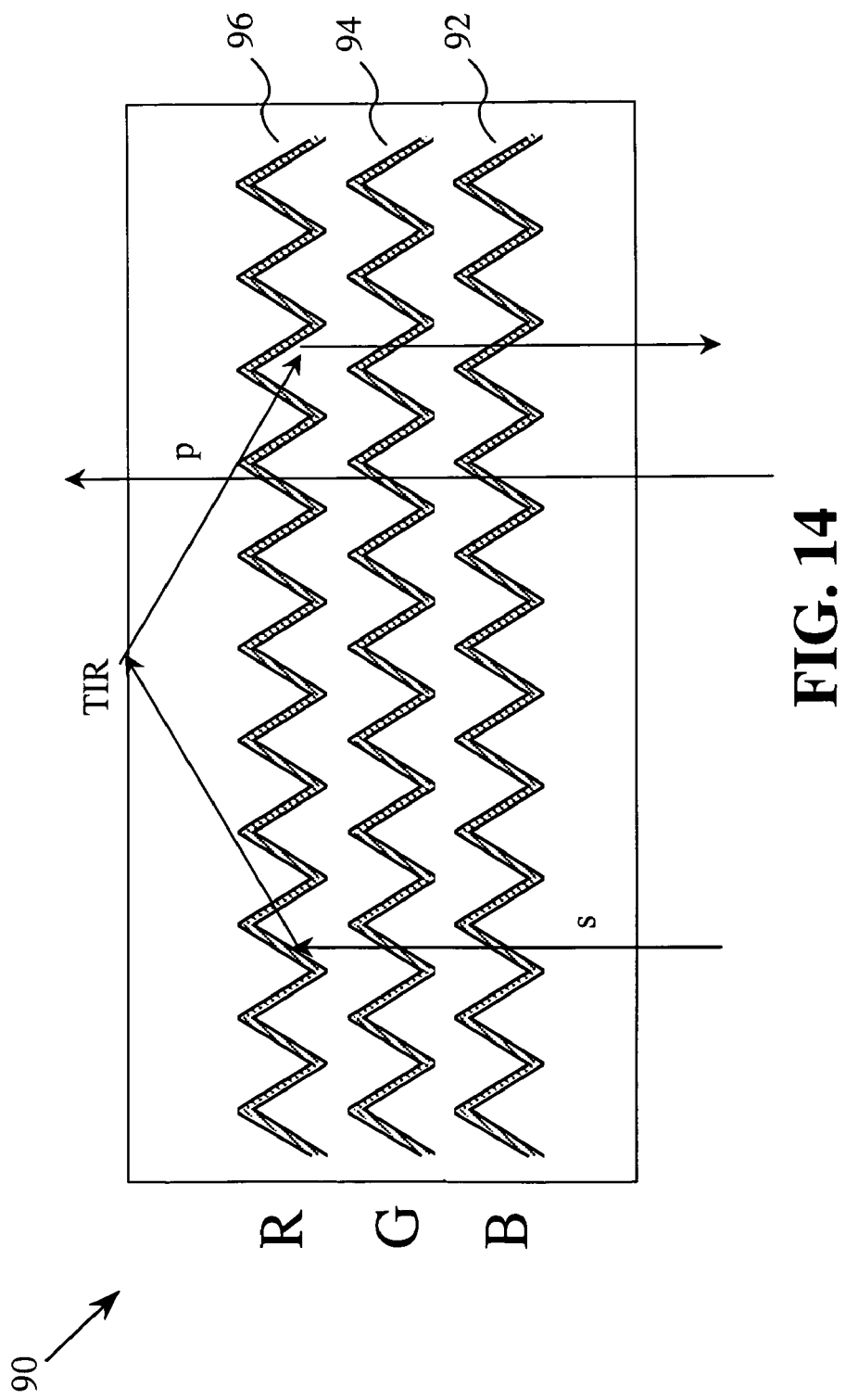
FIG. 14 shows an embodiment of the reflective polarizer with three microstructured surfaces.

An embodiment of a prismatic reflective polarizer 90 with multiple microstructured surfaces 92, 94 and 96 is depicted in FIG. 14. This approach can be used to optimize performance, for example, by having a separate thin film optical coating and microstructured surface for each color (RGB).

Figure 15:
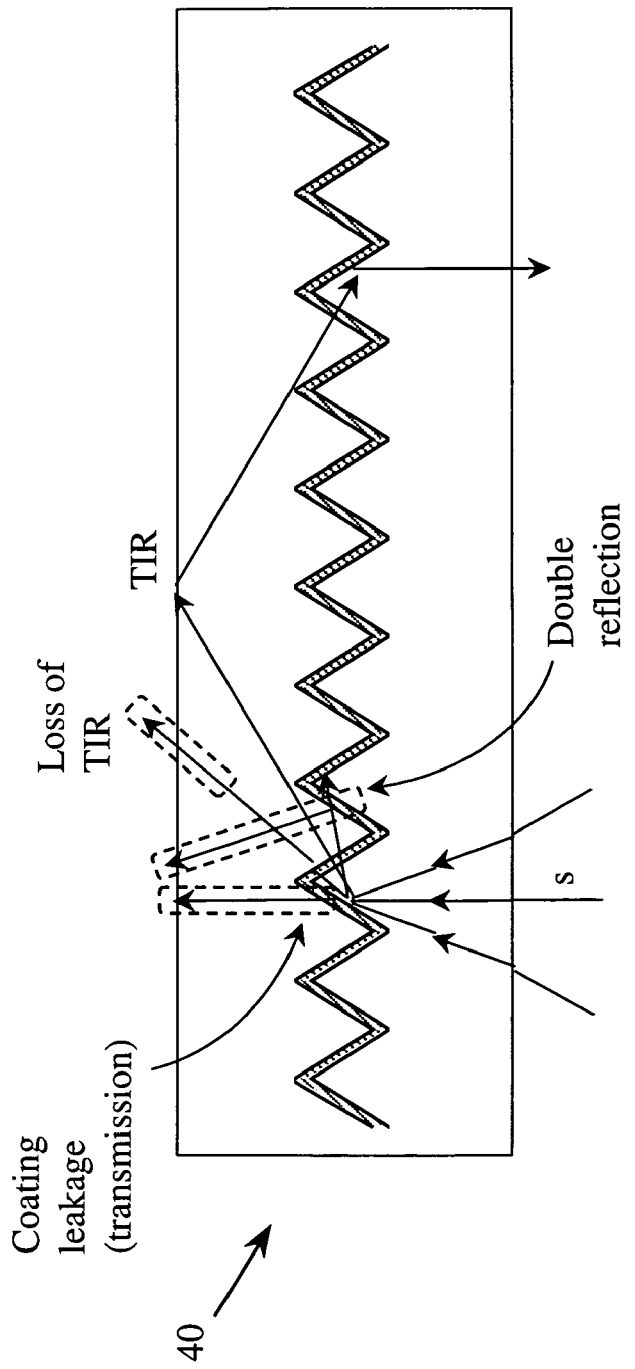
FIG. 15 shows the various means by which desired reflection of s-polarized light is not attained.

The design of the prismatic reflective polarizer can be optimized to limit several factors that may lead to undesirable forward transmission of s-polarized light. As illustrated in FIG. 15, s-polarized light that is normally sent back through the light-entrance surface can pass through the light-exit surface because of 1) direct transmission through the thin film optical coating; or 2) double-reflection by the microstructured surface into the forward direction; or 3) incidence onto the light-exit surface at an angle that is below the critical angle, causing loss of total internal reflection.

Figure 16:
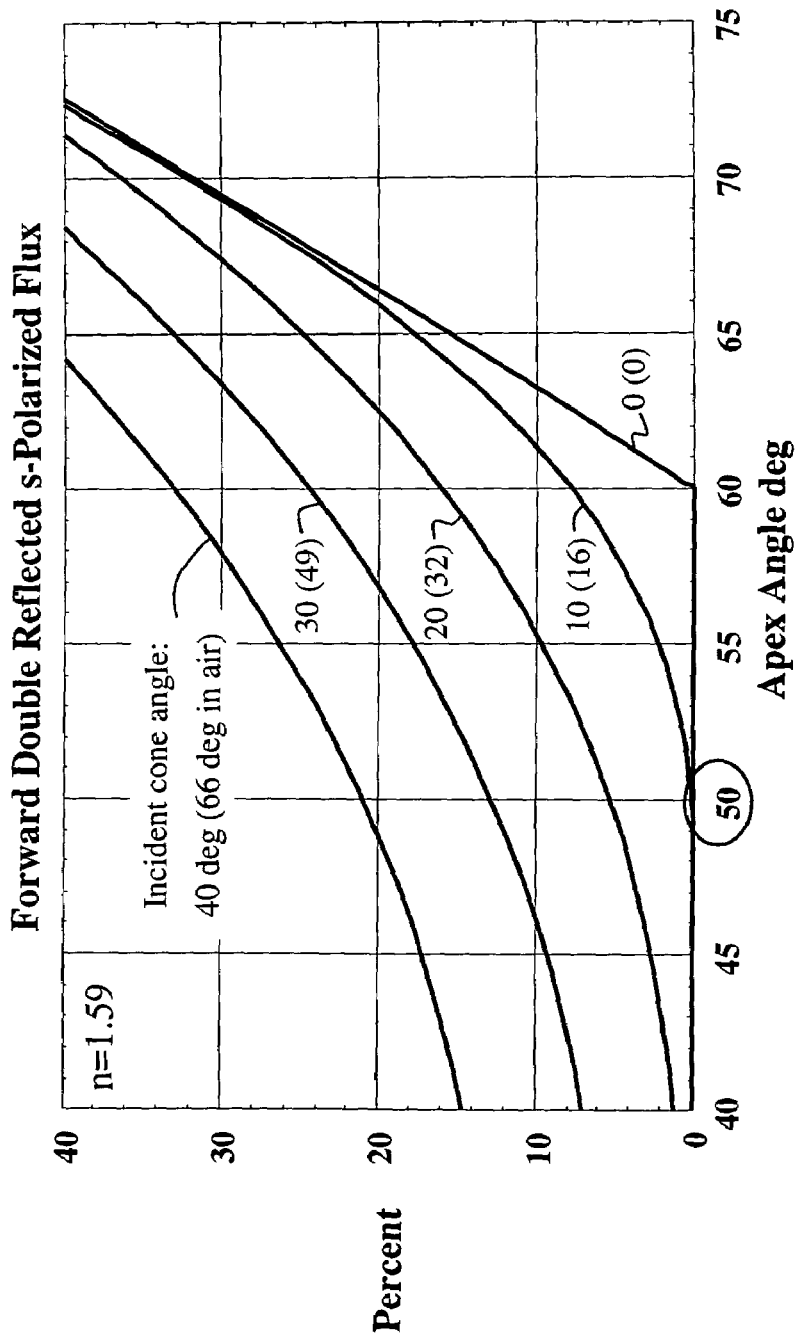
FIG. 16 shows the effect of using an inclination angle of more than 53°.
Figure 17:
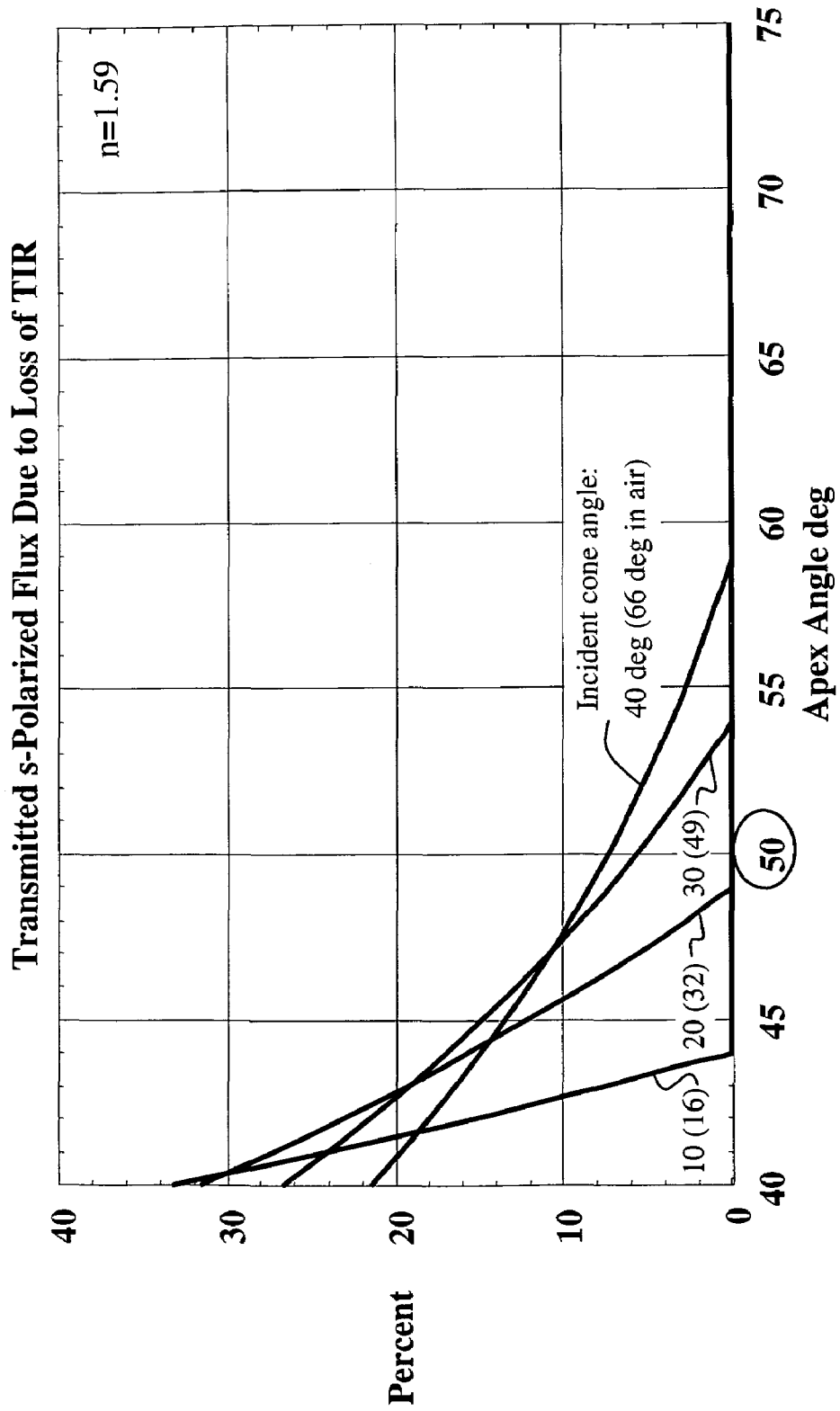
FIG. 17 shows the effect of using an inclination angle of less than about 70°.
Figure 18:
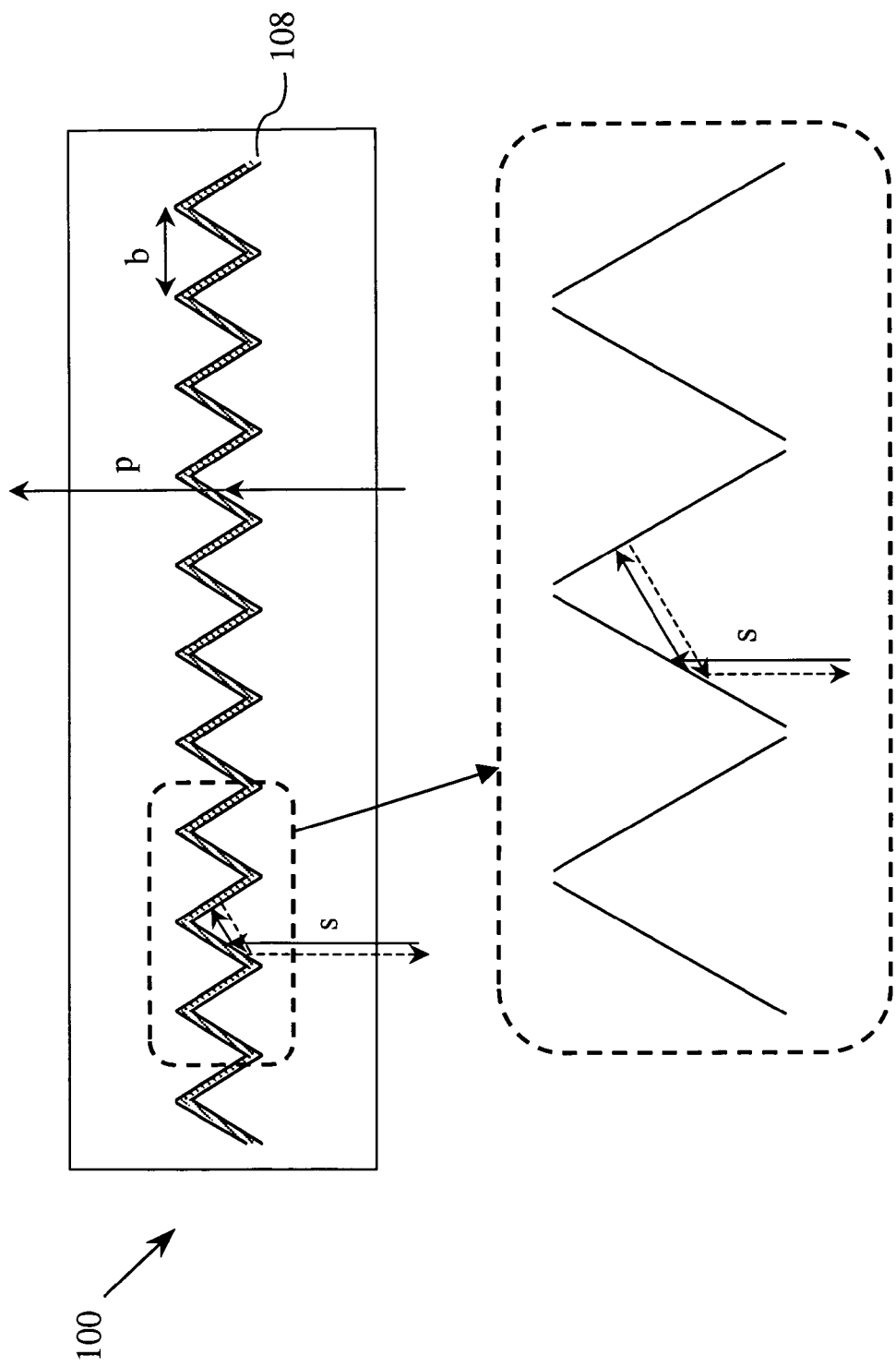
FIG. 18 shows an embodiment of the invention with three reflections at a polarization-selective thin film optical coating.

As described earlier in connection with FIG. 4, FIG. 7 and Table 1, transmission of s-polarized light through the optical coating can be reduced by increasing the number of alternating high and low refractive index layers and by optimizing the thickness of those layers. Forward double-reflection can occur when s-polarized light that is reflected by the thin film optical coating on one prismatic structure intercepts, and is reflected, by an adjacent prismatic structure. As illustrated by the curves of FIG. 16, which show the percentage of s-polarized light flux that is forward double-reflected as a function of apex angle, this effect can be reduced by limiting the apex angle to below approximately 60 degrees, i.e. limiting the inclination angle to greater than 60 degrees. Lastly, as illustrated by the curves of FIG. 17, the apex angle should be kept above approximately 40 degrees, or the inclination angle to less than 70 degrees, to ensure that the majority of s-polarized light flux undergoes total internal reflection at the light-exit surface Another approach for eliminating both forward double reflection and loss of total internal reflection is depicted in FIG. 18. In this embodiment of the prismatic reflective polarizer 100, the polarization-selective thin film optical coating 108 is designed to provide good polarization splitting at high incidence angles and high reflectivity for normal incidence. The preferred apex angle is then approximately 60 degrees.

The embodiments of the present invention all preferentially transmit one polarization of light, usually p-polarization, into the forward direction through a polarization-selective thin film optical coating on a microstructured surface and direct a second polarization, usually s-polarization, into the backward direction by using at least three reflections. All of the reflections may occur at the polarization-selective thin film optical coating, as depicted in FIG. 18, or one or more may occur through total internal reflection at the light-exit surface, as depicted in FIG. 2.

The invention has been described with reference to several embodiments. However, it will be appreciated that variations and modifications can be effected by a person of ordinary skill in the art without departing from the scope of the invention. The entire contents of the patents and other publications referred to in this specification are incorporated herein by reference.

Parts List

10 prismatic reflective polarizer
12 light-entrance medium
14 microstructured surface
16 prismatic structure
17a first sidewall
17b second sidewall
18 thin film optical coating
20 inverted structured surface
21 light-entrance surface
22 light-exit surface
24 pex angle
26 inclination angle 30 p-polarized light
32 s-polarized light
34 once-reflected s-polarized rays
36 doubly-reflected s-polarized rays
38 triply-reflected s-polarized rays
40 prismatic reflective polarizer
42 light-entrance medium
43 light-exit medium
44 microstructured surface
46 prismatic structure
47a first sidewall
47b second sidewall
48 thin film optical coating
50 inverted structured surface
51 light-entrance surface
52 light-exit surface
54 apex angle
56 inclination angle
62 prism film substrate
64 UV curable resin
66 smoothing sheet
70 light source
72 lightbox
76 brightness enhancement prism sheet
80 standoffs
82 retarder film
90 prismatic reflective polarizer
92 microstructured surface
94 microstructured surface
96 microstructured surface
100 prismatic reflective polarizer
108 thin film optical coating

The invention claimed is:

1. A reflective polarizer for an LCD backlight unit comprising:
   (a) a light-entrance medium having a light-entrance surface and a microstructured surface with a series of prismatic structures, wherein first and second sidewalls of each prismatic structure have an inclination angle of more than 53 degrees with respect to the light-entrance surface;
   (b) a polarization-selective thin film optical coating on the series of prismatic structures, for transmitting a first polarization of light and reflecting a second polarization; and
   (c) a light-exit medium on the polarization-selective thin film optical coating that provides a smooth light-exit surface for outputting light from the LCD backlight unit.

2. The reflective polarizer of claim 1, wherein the second polarization of light undergoes three or more reflections before exiting the reflective polarizer film.

3. The reflective polarizer of claim 1, wherein the second polarization of light undergoes total internal reflection at the smooth light-exit surface.

4. The reflective polarizer of claim 1, wherein the inclination angle is not more than 70 degrees.

5. The reflective polarizer of claim 1, wherein the inclination angle is between 60 and 70 degrees.

6. The reflective polarizer of claim 1 wherein standoffs are provided on the light-exit surface of the polarizer to provide an air gap between the polarizer and a surface adjacent to the light-exit surface.

7. The reflective polarizer of claim 1 wherein the first polarization is p-polarization.

8. The reflective polarizer of claim 1 wherein either the light-entrance medium or the light-exit medium comprise an epoxy.

9. The reflective polarizer of claim 8 further comprising a smoothing sheet on the epoxy.

10. The reflective polarizer of claim 1 wherein the polarization-selective thin film optical coating comprises 10 or fewer layers.

11. A method for fabricating a reflective polarizer for an LCD backlight unit comprising the steps of:
   (a) providing a prism substrate having a first smooth surface and a microstructured surface with a series of prismatic structures, wherein first and second sidewalls of each prismatic structure have an inclination angle of more than 53 degrees with respect to the light-entrance surface;
   (b) depositing a polarization-selective thin film optical coating on the series of prismatic structures, for transmitting a first polarization of light and reflecting a second polarization;
   (c) applying an epoxy on top of the polarization-selective thin film optical coating; and
   (d) forming a second smooth surface on the epoxy by attaching a flat smoothing sheet for outputting light from the LCD backlight unit.

12. A method for fabricating a reflective polarizer for an LCD backlight unit comprising the steps of:
   (a) providing a prism substrate having a first smooth surface and a microstructured surface with a series of prismatic structures, wherein first and second sidewalls of each prismatic structure have an inclination angle of more than 53 degrees with respect to the light-entrance surface;
   (b) depositing a polarization-selective thin film optical coating on the series of prismatic structures, for transmitting a first polarization of light and reflecting a second polarization;
   (c) applying an epoxy on top of the polarization-selective thin film optical coating; and
   (d) forming a second smooth surface on the epoxy for outputting light from the LCD backlight unit.

* * * * *